Feb. 7, 1967
E. W. BECHTOLD
3,302,991
SYMMETRICAL SIX-ELEMENT LENS SYSTEM
Filed Feb. 25, 1963
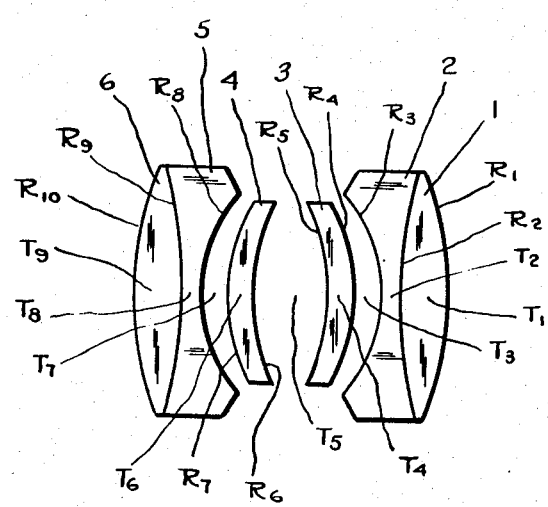
INVENTOR.
EDWIN W. BECHTOLD
BY
ATTORNEY.

United States Patent Office 3,302,991
Patented Feb. 7, 1967

3,302,991
SYMMETRICAL SIX-ELEMENT LENS SYSTEM
Edwin W. Bechtold, Middle Village, N.Y., assignor to The Ednalite Corporation, a corporation of New York
Filed Feb. 25, 1963, Ser. No. 260,432
3 Claims. (Cl. 350—220)

This invention relates to a new and improved lens system and has particular reference to the provision of such a lens system which is particularly adapted for use in photo-copying apparatus, and which possesses very good correction for flatness of field and astigmatism over a wide angular coverage.

An object of the invention is to provide a new and improved lens system with very good correction for flatness of field and astigmatism over a wide angular coverage.

Another object of the invention is to provide a lens system of the type set forth which has only a very small amount of zonal field curvature, with approximately zero astigmatism at all field angles up to plus or minus thirty degrees from the axis.

Another object is to provide new and improved lens system of the type set forth which is particularly adapted for use in photo-copying apparatus.

Other objects and advantages of the invention will be apparent from the following description, taken in connection with the accompanying drawing in which the preferred form of the invention has been given by way of illustration only.

In the drawing there is shown a diagrammatic section of a lens system according to the invention.

The lens system of the present invention is particularly adapted for use where a range of magnifications of from one-half to one, to two-to-one is desired, and the example given is for one-to-one use. For use for other magnifications, the lens system, as a whole, is adjusted to a position to give the desired magnification.

The lens system of the present invention is a symmetrical six-element lens system comprising a pair of doublet members, one of said doublets including the lenses 1 and 2, the other, the lenses 5 and 6 and the pair of meniscus lenses 3 and 4.

While most normal "anastigmats" have a fairly large astigmatic zone, the lens system provided by the present invention has only a very small amount of zonal field curvature, with approximately zero astigmatism at all field angles up to plus or minus thirty degrees from the axis.

In order that this image quality be attained, the arrangement of the indices of refraction is of importance. The index of refraction of the elements 3 and 4 must lie between the indices of refraction of the components of each of the doublets, composed of elements 1 and 2 and 5 and 6. The difference in index between the components of the doublet must be between .060 and .074. For the indices used in the given examples, the desired optical properties will be obtained if the ratios of the radii of curvature at the several refracting surfaces to the focal length are within the following ranges:

$R_1 = -R_{10} = .25f$ to $.26f$
$R_2 = -R_9 = -.67f$ to $-.71f$
$R_3 = -R_8 = .172f$ to $.177f$
$R_4 = -R_7 = .210f$ to $.215f$
$R_5 = -R_6 = .315f$ to $.325f$

The following is a table of constructional data for a specific embodiment of the invention. This embodiment is of a system having an effective focal length of 100 mm. It will be seen that the system may be proportioned to provide systems having other effective focal lengths.

| Lens | Radii, mm. | Thickness | Refractive Index | Dispersion |
|---|---|---|---|---|
| 1 | $R_1 = +25.45$ | $t_1 = 5.29$ | 1.617 | 55.0 |
| 2 | $R_2 = -69.44$ | $t_2 = 1.80$ | 1.5497 | 45.8 |
|   | $R_3 = +17.44$ | $t_3 = .88$ | Air |  |
| 3 | $R_4 = +21.24$ | $t_4 = 3.78$ | 1.5725 | 57.4 |
|   | $R_5 = +31.99$ | $t_5 = 5.4$ | Air |  |
| 4 | $R_6 = -31.99$ | $t_6 = 3.78$ | 1.5725 | 57.4 |
|   | $R_7 = -21.24$ | $t_7 = .88$ | Air |  |
| 5 | $R_8 = -17.44$ | $t_8 = 1.80$ | 1.5497 | 45.8 |
| 6 | $R_9 = +69.44$ | $t_9 = 5.29$ | 1.617 | 55.0 |
|   | $R_{10} = -25.45$ |  |  |  |

In the foregoing table, R refers to the radius of curvature and $t$ refers to the axial thicknesses of the lens members or the air spaces.

From the foregoing, it will be seen that I have provided a new and improved lens system with which it is possible to accomplish all of the objects and advantages of the invention.

I claim:

1. A symmetrical six-element lens system having numerical data substantially as follows:

[EFL-100 mm.]

| Lens | Radii, mm. | Thickness | Refractive Index | Dispersion |
|---|---|---|---|---|
| 1 | $R_1 = +25.45$ | $t_1 = 5.29$ | 1.617 | 55.0 |
| 2 | $R_2 = -69.44$ | $t_2 = 1.80$ | 1.5497 | 45.8 |
|   | $R_3 = +17.44$ | $t_3 = .88$ | Air |  |
| 3 | $R_4 = +21.24$ | $t_4 = 3.78$ | 1.5725 | 57.4 |
|   | $R_5 = +31.99$ | $t_5 = 5.4$ | Air |  |
| 4 | $R_6 = -31.99$ | $t_6 = 3.78$ | 1.5725 | 57.4 |
|   | $R_7 = -21.24$ | $t_7 = .88$ | Air |  |
| 5 | $R_8 = -17.44$ | $t_8 = 1.80$ | 1.5497 | 45.8 |
| 6 | $R_9 = +69.44$ | $t_9 = 5.29$ | 1.617 | 55.0 |
|   | $R_{10} = -25.45$ |  |  |  | wherein the first column lists six lens elements in numerals in order front to rear; R refers to the radius of curvature of the refractive surfaces, and $t$ refers to the axial thicknesses thereof or air spaces.

2. A symmetrical six-element lens system constructed substantially according to the specifications in the following table:

| Lens | Radii | Thicknesses | N | V |
|---|---|---|---|---|
| 1 | $R_1 = +.2545F$ | $t_1 = .0529F$ | 1.617 | 55.0 |
|  | $R_2 = -.6944F$ |  |  |  |
| 2 |  | $t_2 = .018F$ | 1.5497 | 45.8 |
|  | $R_3 = +.1744F$ |  |  |  |
|  |  | $t_3 = .0088F$ | Air |  |
|  | $R_4 = +.2124F$ |  |  |  |
| 3 |  | $t_4 = .0378F$ | 1.5725 | 57.4 |
|  | $R_5 = +.3199F$ |  |  |  |
|  |  | $t_5 = .054F$ | Air |  |
|  | $R_6 = -.3199F$ |  |  |  |
| 4 |  | $t_6 = .0378F$ | 1.5725 | 57.4 |
|  | $R_7 = -.2124F$ |  |  |  |
|  |  | $t_7 = .0088F$ | Air |  |
|  | $R_8 = -.1744F$ |  |  |  |
| 5 |  | $t_8 = .018F$ | 1.5497 | 45.8 |
|  | $R_9 = +.6994F$ |  |  |  |
| 6 |  | $t_9 = .0529F$ | 1.617 | 55.0 |
|  | $R_{10} = -.2545F$ |  |  |  | where F is the equivalent focal length of the system; the first column gives the lens elements numbered in order from front to rear; $R_1$ to $R_{10}$ refer to the radii of curvature of the refractive surfaces numbered consecutively from the front to the rear of the lens system, with the plus and minus values denoting surfaces that are respectively convex and concave to the front; $t_1$, $t_2$, $t_4$, $t_6$, $t_8$ and $t_9$ refer to the axial thicknesses of the lens elements 1, 2, 3, 4, 5 and 6, respectively, and $t_3$, $t_5$ and $t_7$ refer to the axial air spaces between elements 2 and 3, between elements 3 and 4 and between elements 4 and 5, respectively; and N and V denote the refractive and dispersive indices for the lens elements.

3. In a lens system having a light path therethrough which successively traverses a doublet member and menicus, a virtual plane of symmetry and then an identical meniscus and doublet in that order, said doublet and meniscus being constructed and arranged substantially according to the specifications in the following table:

| Lens | Radii | Thicknesses | N | V |
|---|---|---|---|---|
| 1 | $R_1 = +.2545F$ | $t_1 = .0529F$ | 1.617 | 55.0 |
|  | $R_2 = -.6944F$ |  |  |  |
| 2 |  | $t_2 = .018F$ | 1.5497 | 45.8 |
|  | $R_3 = +.1744F$ |  |  |  |
|  |  | $t_3 = .0088F$ | Air |  |
|  | $R_4 = +.2124F$ |  |  |  |
| 3 |  | $t_4 = .0378F$ | 1.5725 | 57.4 |
|  | $R_5 = +.3199F$ |  |  |  |

Where F is the equivalent focal length of the system; numerals 1, 2 and 3 in the first column identify the lens elements of the doublet and the meniscus numbered in order in the direction toward said virtual plane of symmetry; $R_1$ to $R_5$ refer to the radii of curvature of the refractive surfaces numbered consecutively in the direction toward said virtual plane of symmetry, with the plus and minus values denoting surfaces that are respectively concave and convex toward said virtual plane of symmetry; $t_1$, $t_2$ and $t_4$ refer to the axial thicknesses of the lens elements 1, 2 and 3, respectively, and $t_3$ refers to the axial air space between elements 2 and 3; N and V denote the refractive and dispersive indices for the lens elements; and the axial air space between the lens element 3 and said virtual plane of symmetry is substantially .027F.

References Cited by the Examiner

FOREIGN PATENTS 135,853 11/1919 Great Britain.

JEWELL H. PEDERSEN, *Primary Examiner.*

JOHN K. CORBIN, *Examiner.*